(12) United States Patent
Wang et al.

(10) Patent No.: US 11,009,732 B2
(45) Date of Patent: May 18, 2021

(54) DISPLAY PANEL AND DISPLAY DEVICE

(71) Applicant: Shanghai Tianma Micro-Electronics Co., Ltd., Shanghai (CN)

(72) Inventors: Jiaren Wang, Shanghai (CN); Feng Qin, Shanghai (CN); Jiubin Zhou, Shanghai (CN); Lingling Zhang, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 125 days.

(21) Appl. No.: 15/898,817

(22) Filed: Feb. 19, 2018

(65) Prior Publication Data
US 2019/0129217 A1 May 2, 2019

(30) Foreign Application Priority Data
Oct. 30, 2017 (CN) .......................... 201711033108.0

(51) Int. Cl.
*G02F 1/1333* (2006.01)
*G09G 3/36* (2006.01)
*G06F 3/041* (2006.01)
*G02F 1/1343* (2006.01)

(52) U.S. Cl.
CPC ........ *G02F 1/13338* (2013.01); *G02F 1/1343* (2013.01); *G06F 3/0412* (2013.01); *G09G 3/36* (2013.01)

(58) Field of Classification Search
CPC combination set(s) only.
See application file for complete search history.

(56) References Cited

U.S. PATENT DOCUMENTS

| 7,119,801 B1* | 10/2006 | Endo ................... G02F 1/13452 345/204 |
| 2007/0103827 A1* | 5/2007 | Chang ............... G02F 1/136204 361/56 |

(Continued)

FOREIGN PATENT DOCUMENTS

| CN | 201298121 Y | 8/2009 |
| CN | 102375256 A | 3/2012 |

(Continued)

OTHER PUBLICATIONS

Chinese Office Action dated Oct. 31, 2019 for corresponding CN Application No. 201711033108.0.

*Primary Examiner* — Sahlu Okebato
(74) *Attorney, Agent, or Firm* — Tarolli, Sundheim, Covell & Tummino LLP

(57) ABSTRACT

The present disclosure relates to the field of display technologies and, in particular, to a display panel and a display device thereof, for reducing the border width of the display panel. The display panel includes: a display substrate including a display area and a stepped area disposed at a side of the display area, an integrated substrate is provided with an integrated circuit, and a flexible circuit board respectively connected with the stepped area of the display substrate and with the integrated substrate. The integrated circuit is electrically connected with the display substrate via a circuit on the flexible circuit board. The display panel is applicable in the display device.

10 Claims, 9 Drawing Sheets

(56) References Cited

U.S. PATENT DOCUMENTS

| | | | | |
|---|---|---|---|---|
| 2008/0062140 A1* | 3/2008 | Hotelling | ............ | G09G 3/3648 |
| | | | | 345/173 |
| 2014/0098055 A1* | 4/2014 | Choi | .................... | G06F 3/0416 |
| | | | | 345/174 |
| 2015/0185902 A1* | 7/2015 | Liu | ......................... | G06F 3/044 |
| | | | | 345/174 |
| 2016/0172346 A1* | 6/2016 | Koresawa | ............. | H01L 25/167 |
| | | | | 257/99 |
| 2017/0352716 A1* | 12/2017 | Lee | .................... | H01L 27/3276 |
| 2020/0033972 A1* | 1/2020 | Huang | ................ | G02F 1/13338 |

FOREIGN PATENT DOCUMENTS

| | | |
|---|---|---|
| CN | 105826353 A | 8/2016 |
| CN | 107193166 A | 9/2017 |

\* cited by examiner

DISPLAY PANEL AND DISPLAY DEVICE

CROSS-REFERENCE TO RELATED APPLICATIONS

The present application claims priority to Chinese Patent Application No. 201711033108.0, filed on Oct. 30, 2017, the content of which is incorporated herein by reference in its entirety.

TECHNICAL FIELD

The present disclosure relates to the field of display technologies and, in particular, to a display panel and a display device.

BACKGROUND

With the development of display technology, the display device goes into the peoples' life, and the display device is developing to achieve a narrow border so as to realize full-screen display. That is, the non-display area outside the display area of the display panel is getting narrower and narrower.

Therefore, how to achieve a narrower border of the display device is a technical challenge in the current industry.

SUMMARY

In view of the above, the present disclosure provides a display panel and a display device for reducing the border width of the display panel.

In one aspect, the present disclosure provides a display panel, including: a display substrate including a display area and a stepped area disposed at a side of the display area; an integrated substrate which is provided with an integrated circuit; and a flexible circuit board respectively connected with the stepped area of the display substrate and with the integrated substrate; wherein the integrated circuit is electrically connected with the display substrate via a circuit on the flexible circuit board.

In another aspect, the present disclosure provides a display device including a display panel, the display panel includes: a display substrate including a display area and a stepped area disposed at a side of the display area; an integrated substrate which is provided with an integrated circuit; and a flexible circuit board respectively connected with the stepped area of the display substrate and with the integrated substrate; wherein the integrated circuit is electrically connected with the display substrate via a circuit on the flexible circuit board.

Each of the above technical solutions has the following beneficial effects:

The integrated circuit IC is disposed on the integrated substrate, and the integrated circuit IC is electrically connected with the display substrate via the circuit on the flexible circuit board. Therefore, as for the display panel having a certain size, a width of the stepped area can be provided relatively small, which correspondingly reduces a width of the border of the display panel along the width direction of the stepped area, thereby being beneficial to achieving a narrow border and thus in line with the prevailing trend.

BRIEF DESCRIPTION OF DRAWINGS

In order to make the technical solutions in the embodiments of the present disclosure to be clearer, the accompanying drawings required for illustrating the embodiments will be briefly introduced in the following. Obviously, the accompanying drawings in the following merely show some embodiments of the present disclosure, and a person skilled in the art may still obtain other accompanying drawings on the basis of the following accompanying drawings without creative efforts.

DESCRIPTION OF EMBODIMENTS

In order to make the purpose, technical solutions, and advantages of the embodiments of the present disclosure be understandable, the technical solutions in the embodiments of the present disclosure are described in the following with reference to the accompanying drawings. The described embodiments are merely exemplary embodiments of the present disclosure, which shall not be interpreted as providing any limitation to the present disclosure. All other embodiments obtained by those skilled in the art without creative efforts according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be noted that, the expressions such as "upper", "lower", "left", "right" and the like mentioned in embodiments of the present disclosure are described with reference to the placement status in the accompanying drawings, and should not be construed as limiting embodiments of the present disclosure. In addition, it should also be understood that, in the context, while referring to an element being formed "above" or "below" another element, it is possible that the element is directly formed "above" or "below" the other element, and it is also possible that the element is formed "above" or "below" the other element via an intermediate element.

Figure 1:
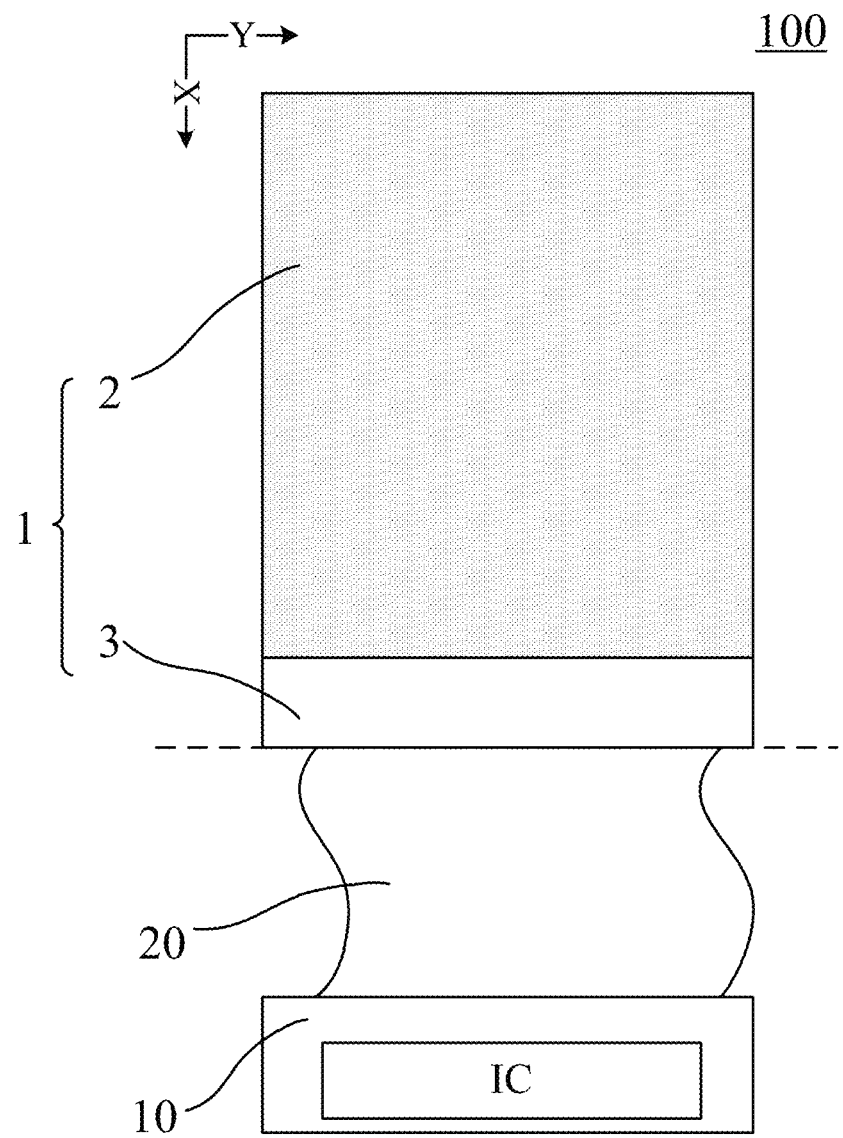
FIG. 1 is a structural schematic diagram of a display panel provided by an embodiment of the present disclosure.

The present disclosure provides a display panel, as shown in FIG. 1, FIG. 1 is a structural schematic diagram of a display panel provided by an embodiment of the present disclosure. The display panel 100 includes: a display substrate 1 including a display area 2 and a stepped area 3 disposed at a side of the display area 2; an integrated substrate 10; a flexible circuit board 20 respectively connected with the stepped area 3 of the display substrate 1 and the integrated substrate 10. An integrated circuit IC is provided on the integrated substrate 10, and the integrated circuit IC is electrically connected with the display substrate 1 via a circuit on the flexible circuit board 20.

In the related art, the integrated circuit IC is arranged in a manner of chip on glass (Chip On Glass, COG), that is, the integrated circuit IC is directly disposed on the display substrate, for example, the integrated circuit IC is disposed in the stepped area of the display substrate. As for a display panel having a certain size, since the IC disposed in the stepped area occupies a certain area of the display panel, the area of the display area remained for displaying relatively decreases, which is contrary to the prevailing trend and adverse to realization of a narrow border.

In an embodiment, the integrated circuit IC is disposed on the integrated substrate, and the integrated circuit IC is electrically connected with the display substrate via the circuit on the flexible circuit board. Therefore, as for the display panel having a certain size, a width of the stepped area can be provided relatively small, which correspondingly reduces a width of the border of the display panel along the width direction of the stepped area, which is in line with the prevailing trend and beneficial to realization of a narrow border.

It should be noted that, in the display panel 100, an area excluding the display area 2 may be referred to as a non-display area, that is, all of the stepped area 3, the flexible circuit board 20 and the integrated substrate are disposed in the non-display area. The arrangement of the above three elements does not influence a normal display size of the display panel, for the following reasons.

With reference to FIG. 1, during operation of the display panel 100, the flexible circuit board 20 and the integrated substrate 10 are folded back to the back side of the display substrate 1 along the dashed line, so as not to increase the display size of the display panel. In other words, along the X direction, a length of the display panel can be construed as a length of the display substrate 1. In this case, as for the display substrate 1, the smaller the width of the stepped area 3 along the X direction, the larger the area of the display area for displaying, and the more in line with the prevailing trend of a full-screen display. Therefore, in this embodiment, since the integrated circuit IC is disposed on the integrated substrate so as not to occupy the space of the stepped area, the width of the stepped area along the X direction may be provided smaller.

In addition, with reference to the orientation shown in FIG. 1, the stepped area in FIG. 1 is disposed under the display substrate. Actually, the stepped area may be disposed at the left side or the right side of the display substrate, and the position of the stepped area will not be limited by the present disclosure. Moreover, the sizes of the integrated substrate, the flexible circuit board and the integrated circuit IC shown in FIG. 1 do not represent actual sizes during manufacture process.

Figure 2:
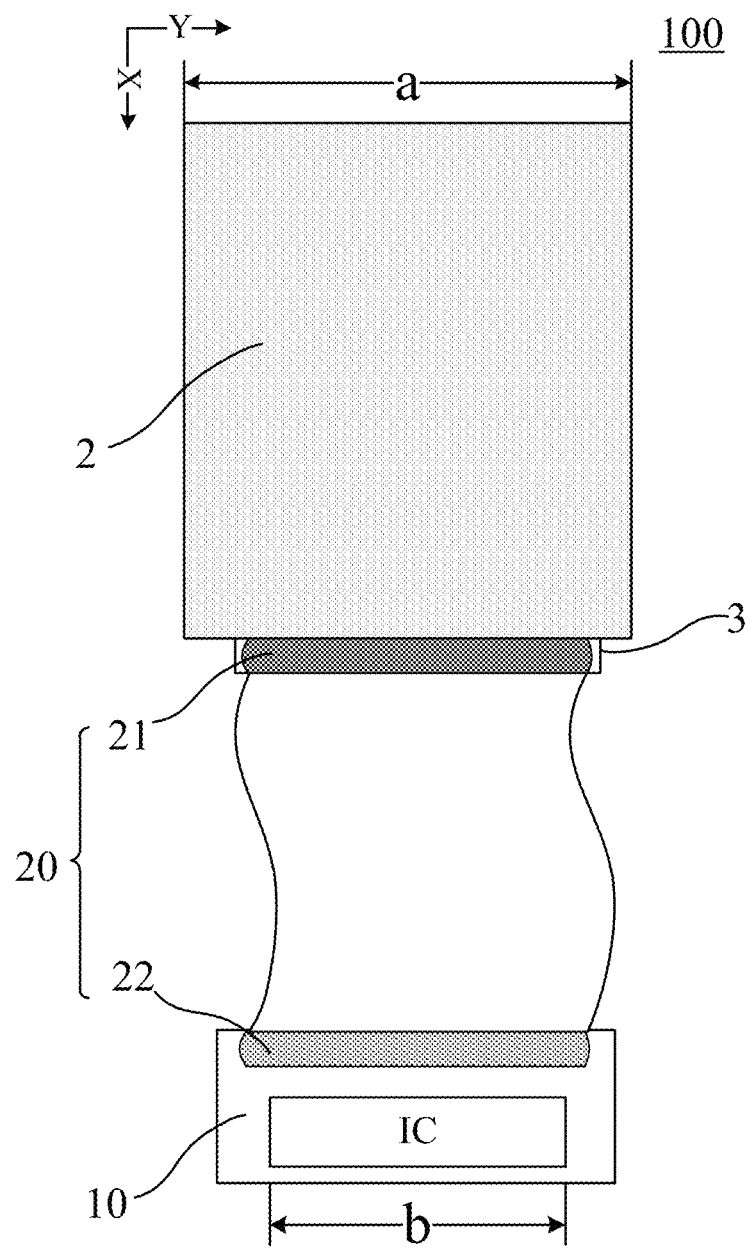
FIG. 2 is another structural schematic diagram of a display panel provided by an embodiment of the present disclosure.

As shown in FIG. 2, FIG. 2 is another structural schematic diagram of a display panel provided by an embodiment of the present disclosure. A stepped bonding area 21 and an integrated bonding area 22 are arranged at two opposite sides of the flexible circuit board 20. The flexible circuit board 20 is bonded to the stepped area 3 via the stepped bonding area 21, and the flexible circuit board 20 is bonded to the integrated substrate 10 via the integrated bonding area 22. For example, the flexible circuit board 20 may be respectively bonded to the stepped area 3 and the integrated substrate 10 of the display substrate 1 by a thermo-compression bonding technique.

With reference to FIG. 2, since an integrated circuit IC is not arranged in the stepped area 3, the width of the stepped area 3 in the X direction may be smaller, for example, the width of the stepped area 3 in the X direction may be equal to the width of the stepped bonding area in the X direction. Accordingly, as for the display panel having a certain size, when the width of the stepped area decreases, the width of the border along the X direction decreases; and as for the display panel having a certain size, the area of the display area for displaying relatively increases, which is beneficial to realization of the full-screen design. In addition, the width of the stepped area along the Y direction will not be limited in the present disclosure, as long as it is compatible with the stepped bonding area.

At present, the display panel not only has a display function, but also has a touch function, a force touch function and the like. The display function, touch function and force touch function may need different circuits for driving, and the driving work is generally completed by the integrated circuit IC. For example, as for the touch function, it is required to connect a leading wire of a touch circuit with a pin of the integrated circuit IC, and then a corresponding touch position is obtained by analysis and judgment of the integrated circuit IC, so that a corresponding touch operation is started. In this case, more and more functions are bound to increase the number of the pins (ports) of the integrated circuit IC.

In order to solve the above problem of port shortage of the integrated circuit IC, multiple integrated circuits IC may be provided. For example, the display panel includes two or more integrated circuits IC, one of which is a display integrated circuit IC only for driving a circuit for displaying, and another of which is a touch integrated circuit IC only for driving a circuit for touch function. On the one hand, the multiple integrated circuits IC occupy more space, and on the other hand, the cost of the multiple integrated circuits IC is higher, which is adverse to reducing cost.

In an embodiment, in order to solve the above problem of port shortage of the integrated circuit IC, the inventor provides the following setting manners of the integrated circuit IC.

Figure 3:
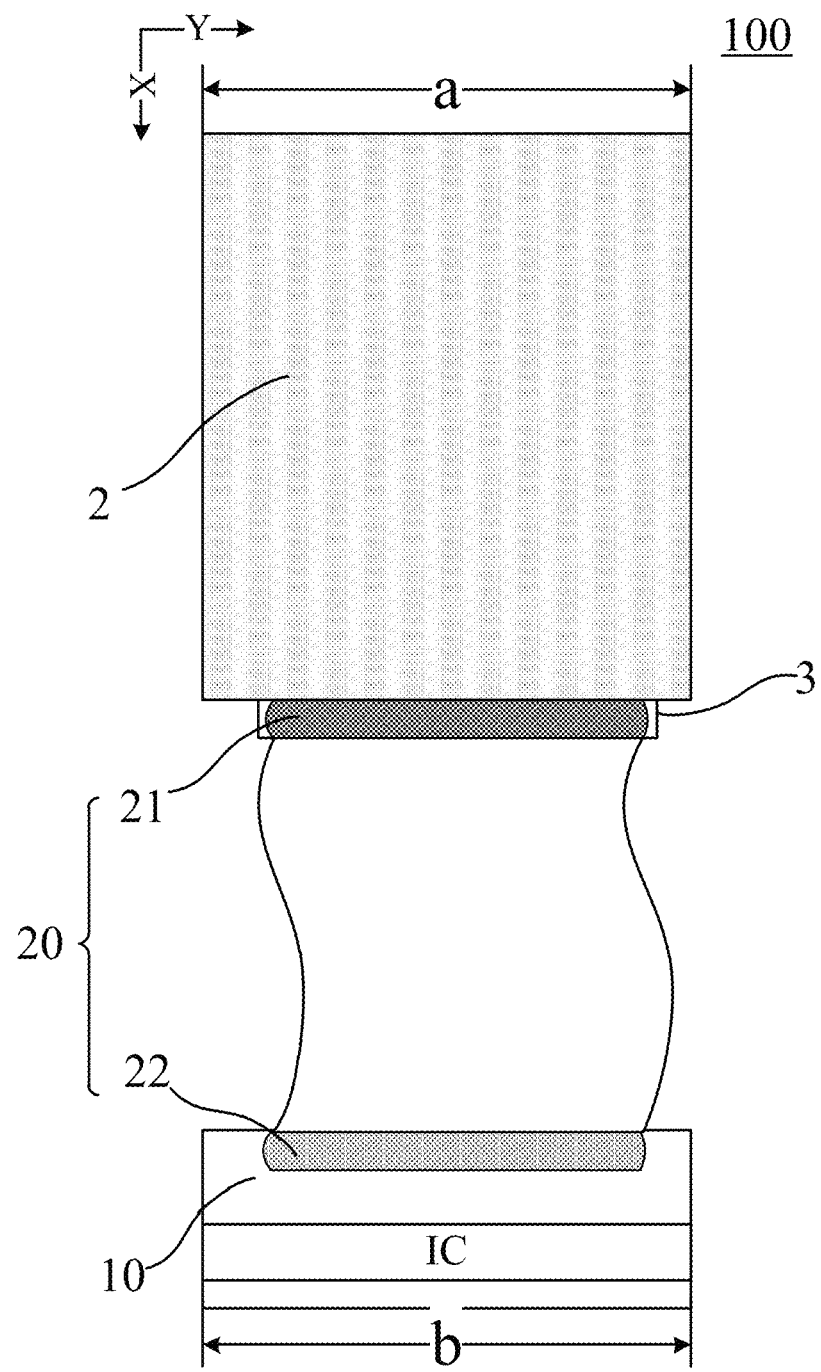
FIG. 3 is another structural schematic diagram of a display panel provided by an embodiment of the present disclosure.

In a first manner, with reference to FIG. 2 and FIG. 3, FIG. 3 is another structural schematic diagram of a display panel provided by an embodiment of the present disclosure. The display panel 100 includes: a display area 2 and a stepped area 3 sequentially arranged on the display substrate 1 along a first direction X; the integrated circuit IC is arranged along a second direction Y, and the first direction X may intersect with the second direction Y. In this case, as for a certain display substrate, the width of the display substrate 1 along the second direction Y is a certain value, a corresponding integrated circuit IC can be selected according to requirements of the display panel 100. For example, when it is required that the number of ports (pins) of the integrated circuit IC is relatively small, the width of the integrated circuit IC along the second direction Y is decreased to the greatest extent, so as to reduce cost while satisfying the requirements. That is, as shown in FIG. 2, the width a of the display substrate along the second direction Y is greater than the width b of the integrated circuit IC along the second direction Y; when it is required that the number of ports (pins) of the integrated circuit IC is relatively large, as shown in FIG. 3, the width b of the integrated circuit IC along the second direction Y is equal to the width a of the display substrate along the second direction Y, i.e., a=b, so that the number of ports (pins) of the integrated circuit IC can be provided as large as possible. Compared with the solution that two circuits IC are provided on the integrated substrate, the cost is decreased and the space occupied by the integrated circuit IC is relatively decreased.

Figure 4:
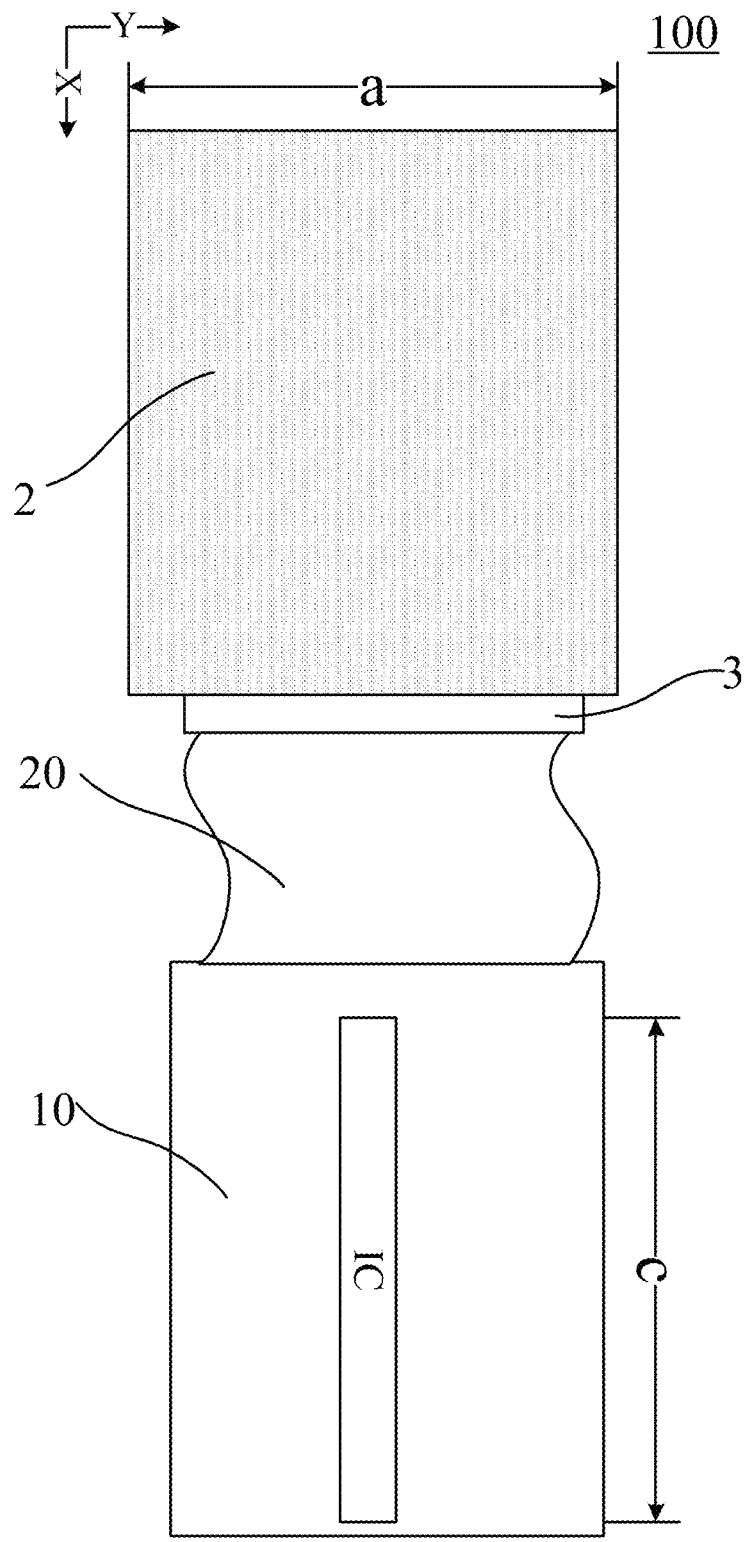
FIG. 4 is another structural schematic diagram of a display panel provided by an embodiment of the present disclosure.

In a second manner, with reference to FIG. 4, FIG. 4 is another structural schematic diagram of a display panel provided by an embodiment of the present disclosure. The display panel 100 includes: a display area 2 and a stepped area 3 sequentially arranged on the display substrate 1 along a first direction X; the integrated circuit IC is arranged along the first direction X, the width a of the display substrate 1 along a second direction Y is smaller than the width c of the integrated circuit IC along the first direction X, and the first direction X intersects with the second direction Y.

In order to provide more ports for the integrated circuit IC, the integrated circuit IC may be disposed along the first direction X such that the width of the integrated circuit IC is not restricted by the width a of the display substrate 1 along the second direction Y. In this case, the width c of the integrated circuit IC along the first direction X is greater than the width a of the display substrate 1 along the second direction Y. On the one hand, more ports can be provided on the integrated circuit IC, the integrated circuit IC can be integrated with more functions such as display, touch and force touch, etc. On the other hand, the smaller the number of the integrated circuit IC, the less space occupied and the lower the cost.

Figure 5:
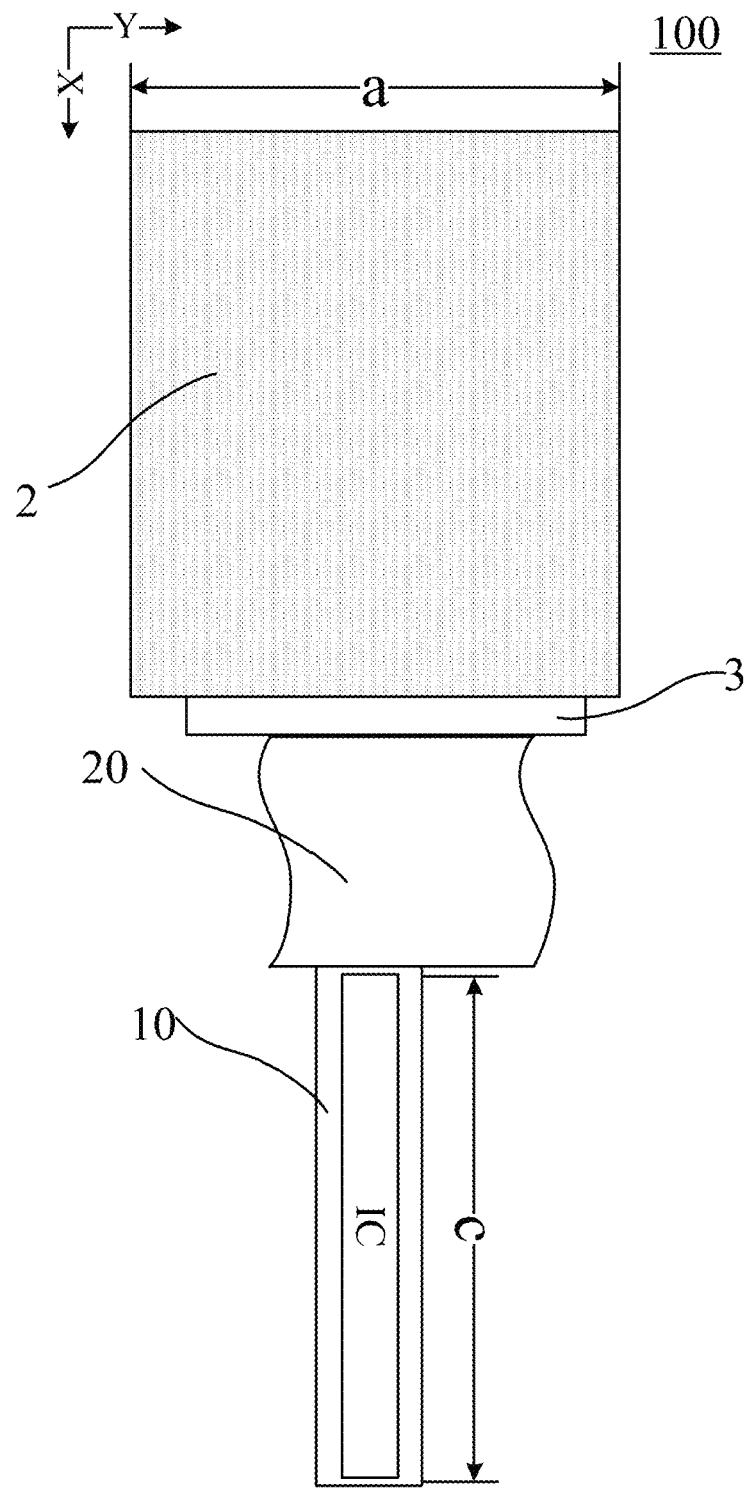
FIG. 5 is another structural schematic diagram of a display panel provided by an embodiment of the present disclosure.

It should be noted that, as shown in FIG. 5, FIG. 5 is another structural schematic diagram of a display panel provided by an embodiment of the present disclosure. The width of the integrated substrate (provided with the integrated circuit IC) along the Y direction and along the X direction will not be limited by the present embodiment, as long as it is compatible with the integrated circuit IC and it is possible to place the integrated circuit IC thereon. As shown in FIG. 5, a smaller integrated substrate, which occupies a relatively small area, effectively releases space that it occupies.

In addition, the width of the flexible circuit board 20 along the first direction X and along the second direction Y will not be limited by the present embodiment, as long as it can electrically connect the integrated circuit IC with the display substrate.

Figure 6:
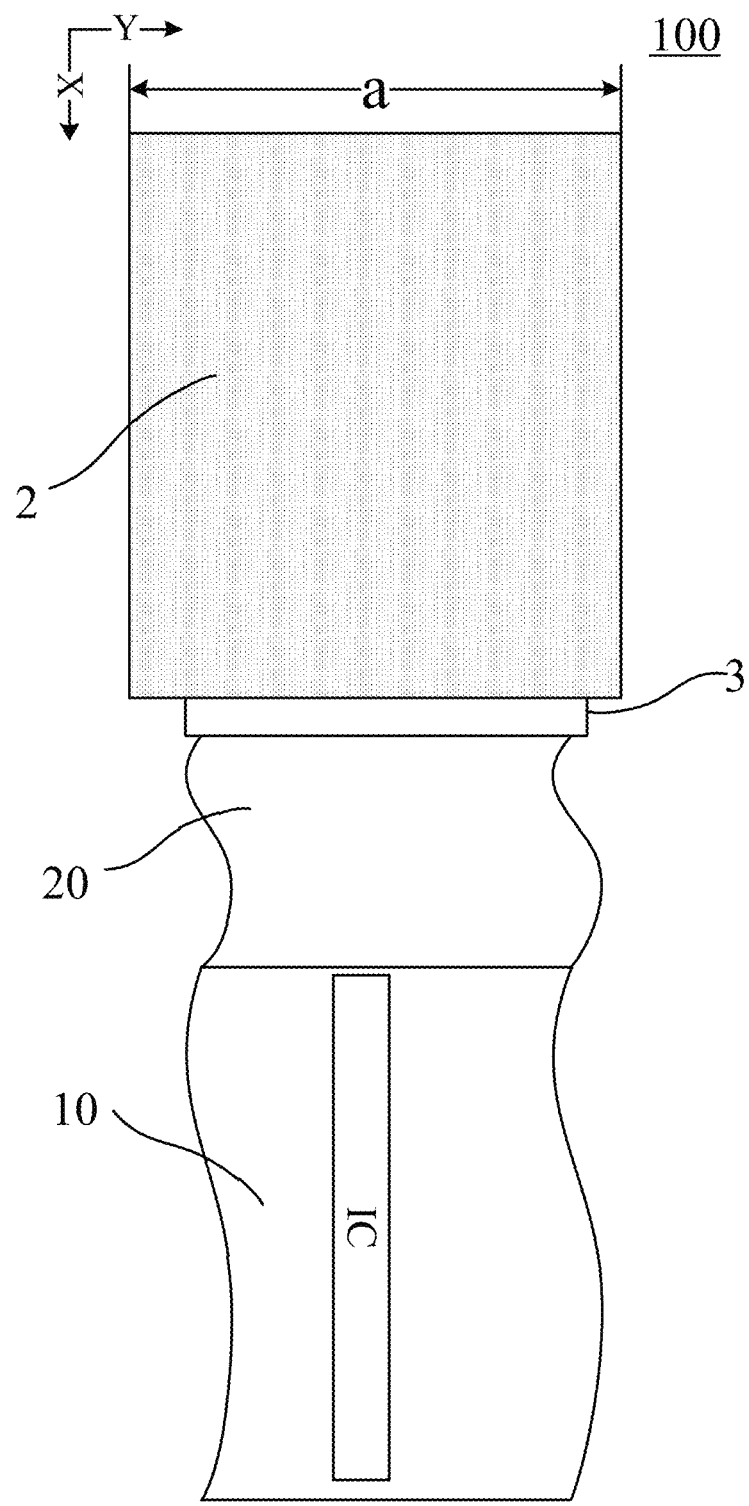
FIG. 6 is another structural schematic diagram of a display panel provided by an embodiment of the present disclosure.

In an embodiment, as shown in FIG. 6, FIG. 6 is another structural schematic diagram of a display panel provided by an embodiment of the present disclosure. The integrated substrate 10 may be a flexible integrated substrate, and the flexible integrated substrate may be made of a variety of materials, such as a flexible plastic film and the like. In order to balance the cost, preferably in the present embodiment, the material of the flexible integrated substrate may be polyesteramide.

It should be noted that, in an embodiment of the present disclosure, the material of the integrated substrate is polyesteramide the spacing between the pins of the integrated circuit IC on the polyesteramide is provided smaller, for example, approximately 10 μm. Smaller pin spacing allows a larger number of ports (pins) to be provided on the integrated circuit IC having a certain size, so that the display, touch and force touch can be driven simultaneously by only one integrated circuit IC, the integration level being relatively high.

Optionally, as shown in FIG. 3 and FIG. 4, the integrated substrate 10 may be an inflexible integrated substrate, and the inflexible integrated substrate may be made of a variety of materials. In order to balance the cost, preferably in the present embodiment, the material of the inflexible integrated substrate may be glass. The spacing between the pins of the integrated circuit IC on the glass is provided smaller, for example, approximately 10 μm.

Another setting manner of the integrated circuit IC is provided, that is, COF (chip on flex (FPC, flexible printed circuit)). The integrated circuit IC is set on a flexible circuit board, and a side of the flexible circuit board is bonded to a side of the display substrate. In the COF setting manner, as for the display panel having a certain size, although the display area for displaying on the display panel is relatively large, as for the integrated circuit IC bonded to the flexible circuit board, the spacing between the pins of the integrated circuit IC is relatively large, for example, the spacing between the pins of the integrated circuit IC on the COF is approximately 23 μm. Larger pin spacing only allows a smaller number of ports (pins) to be provided on the integrated circuit IC having a certain size, and thus only a smaller number of functions can be implemented on the integrated circuit IC, resulting in a relatively low integration level of the integrated circuit IC.

In an embodiment, the integrated circuit IC may be disposed on an inflexible integrated substrate, such as glass. Compared with the COF setting manner, as for a display panel having a certain size, such a design has no reduction in the area of the display area occupied by the display panel, and the same display effect can be achieved. However, the two setting manners adopt different integrated circuits IC, therefore, as for the COF setting manner, it leads to relatively large spacing between the pins of the integrated circuit, a relatively small number of ports, and a lower integration level. In the present embodiment, as for the integrated circuit IC disposed on the inflexible integrated substrate, the spacing between the pins is relatively small and the number of the ports is relatively large, in other words, the technical solution provided in this embodiment has a much higher integration level than the technical solution provided by the COF setting manner. Besides, as for the COF setting manner, the manufacturing cost of the integrated circuit is much higher than the manufacturing cost of the integrated circuit provided on the inflexible substrate in this embodiment.

In an embodiment, it is also possible to provide the integrated circuit IC on a flexible integrated substrate, for example, a polyesteramide integrated substrate. Compared with the COF manner, as for the integrated circuit IC provided on the flexible integrated substrate in the present embodiment, the spacing between the pins is relatively small, the number of the pins (ports) is relatively large, the integration level is relatively high, and more functions can be achieved by the integrated circuit IC.

Assuming that the number of pins (ports) required for achieving the display function, touch function and force touch function is 100, then these functions can be achieved by using only one integrated circuit IC in an embodiment of the present disclosure. As for the COF setting manner, it may require two integrated circuits IC to achieve the above-mentioned functions. Therefore, the solution in the present embodiment can effectively reduce the number of the integrated circuits IC, thereby reducing the cost.

Therefore, considering the cost and integration level, it is preferable in the present disclosure that the integrated circuit IC is provided on the inflexible integrated substrate.

Figure 7:
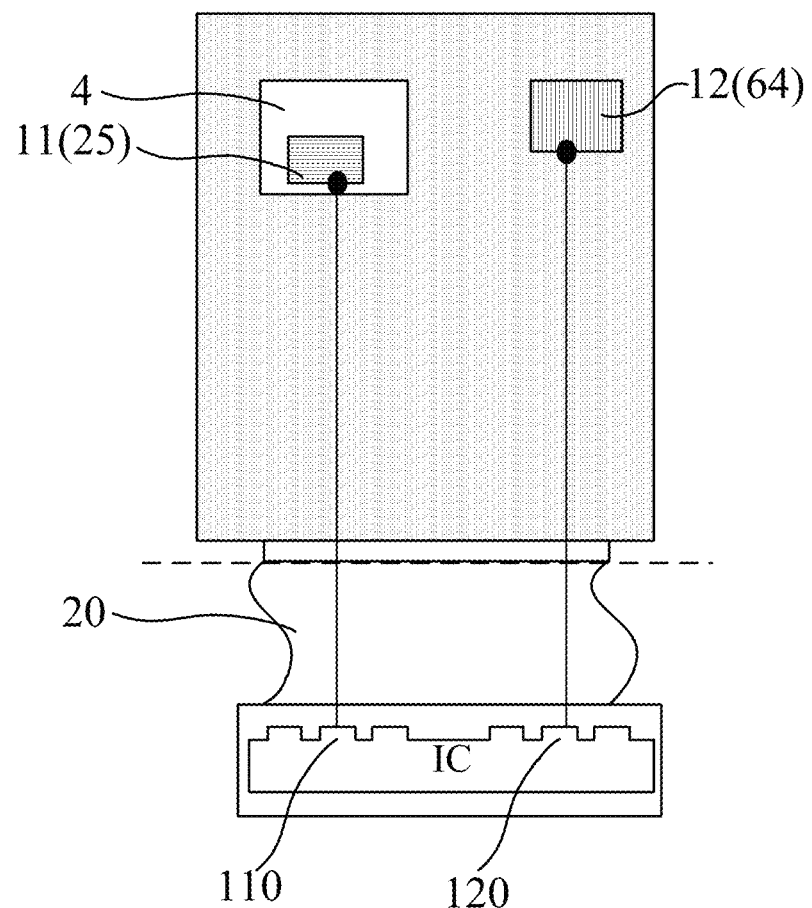
FIG. 7 is another structural schematic diagram of a display panel provided by an embodiment of the present disclosure.

In an embodiment, as shown in FIG. 7, FIG. 7 is another structural schematic diagram of a display panel provided by an embodiment of the present disclosure. The display substrate 1 includes a display circuit 11 and a touch circuit 12. The integrated circuit IC includes a display pin 110 and a touch pin 120. The display pin 110 is electrically connected with the display circuit 11, and the touch pin 120 is electrically connected with the touch circuit 12.

Further, as shown in FIG. 7, the display circuit 11 includes a pixel electrode 25 disposed on the display substrate 1, and the pixel electrode 25 is electrically connected with the display pin 110; the touch circuit 12 includes a touch electrode 64 disposed on the display substrate 1, and the touch electrode 64 is electrically connected with the touch pin 120.

In the embodiment, the integrated circuit IC includes the display pin for providing a drive electrical signal to a sub-pixel, as well as a touch pin for sensing a touch operation, so as to realize a touch operation. As for the integrated circuit IC, the integration level is relatively high.

It should be noted that, as an example, FIG. 7 shows only one sub-pixel, however, a plurality of sub-pixels 4 are actually provided on the display substrate 1, each sub-pixel 4 includes a pixel electrode 25, and the pixel electrode 25 provides a display signal to a corresponding sub-pixel 4. The display principle of the sub-pixel will be described in detail in the following. In addition, FIG. 7 shows only one touch electrode, however, a plurality of touch electrodes 64 are provided on the display substrate 1, and the touch electrodes are used for sensing a touch operation, so as to realize the touch function. The touch principle of the touch electrodes will be described in the following, which will not be further described herein. In addition, although both the pixel electrode 25 and the touch electrode 64 are shown in FIG. 7, however, in an embodiment, the pixel electrode and the touch electrode are not in the same film layer, therefore, the pixel electrode 25 and the touch electrode 64 will not interfere with each other. The display circuit 11 and the touch circuit 12 are electrically connected with the integrated circuit IC via a circuit on the flexible circuit board 20. In a final product, both the flexible circuit board 20 and the integrated substrate are folded back to the back side of the display substrate, so as not to increase the non-display area of the display panel.

Figure 8:
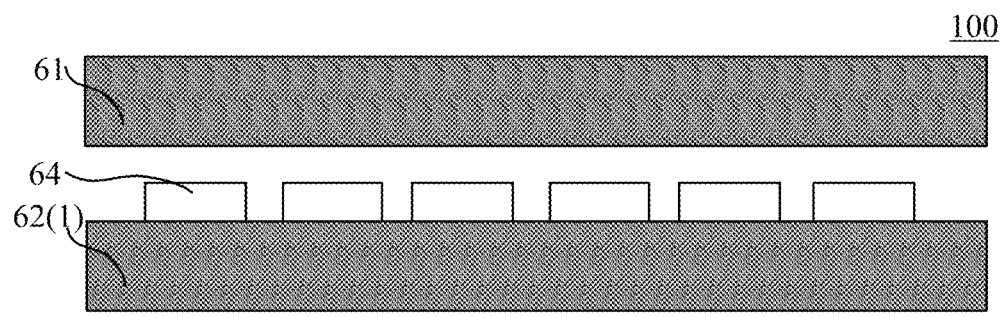
FIG. 8 is another structural schematic diagram of a display panel provided by an embodiment of the present disclosure.

In an embodiment, as shown in FIG. 8, FIG. 8 is another structural schematic diagram of a display panel provided by an embodiment of the present disclosure. The display panel 100 may be a liquid crystal display panel, and the liquid crystal display panel includes: an array substrate 62, a color film substrate 61 arranged opposite to the array substrate 62, and a plurality of touch electrodes 64. The plurality of touch electrodes 64 is provided at a side of the array substrate 62 facing the color film substrate 61.

Figure 9:
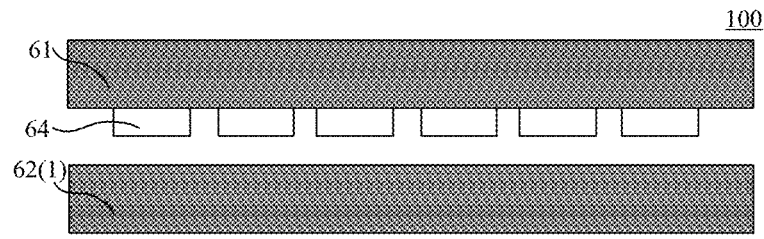
FIG. 9 is another structural schematic diagram of a display panel provided by an embodiment of the present disclosure.

In another embodiment, as shown in FIG. 9, FIG. 9 is another structural schematic diagram of a display panel provided by an embodiment of the present disclosure. The display panel 100 may be a liquid crystal display panel, and the liquid crystal display panel includes: an array substrate 62, a color film substrate 61 arranged opposite to the array substrate 62, and a plurality of touch electrodes 64. The plurality of touch electrodes 64 is disposed at a side of the color film substrate 61 facing the array substrate 62.

Further, in an embodiment, the display substrate 1 may be a color film substrate 61, or an array substrate 62. In the present embodiment, the array substrate is preferably taken as the display substrate, i.e., the stepped area is provided on the array substrate 62, so that the wiring is convenient, and the circuit setting is more applicable. For example, the display circuit, the touch circuit and the force touch circuit may be arranged on the array substrate.

It should be noted that, it is an In-Cell method that the touch electrodes are disposed between the array substrate and the color film substrate, that is, the touch function is embedded in the liquid crystal pixels. A touch sensor can be embedded in the display panel so that the display function and the touch function can be bonded together, that is, the display function is implemented in the display stage, the touch function is implemented in the touch stage, so that the display panel can be made lighter and thinner.

In order to describe the above-mentioned In-Cell display panel more clearly, in combination with FIG. 9, FIG. 10 and FIG. 11, an operation principle of how the In-Cell display panel implements the display and touch function will be briefly described in the following by taking a liquid crystal display panel as an example.

Figure 10:
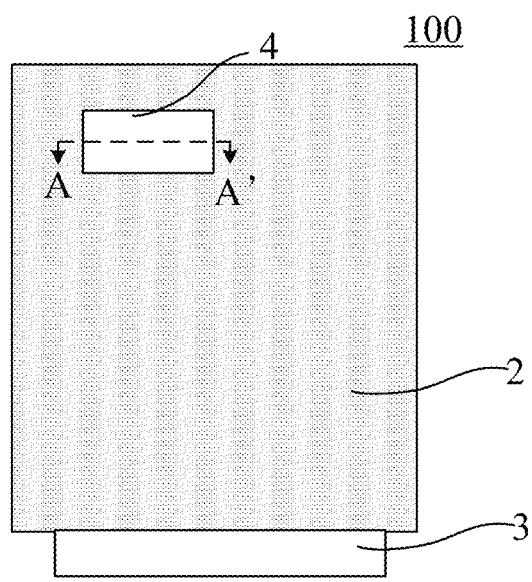
FIG. 10 is another structural schematic diagram of a display panel provided by an embodiment of the present disclosure.
Figure 11:
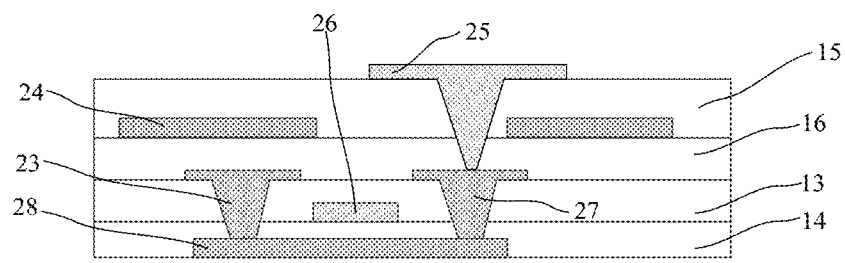
FIG. 11 is a cross-sectional view of AA' direction shown in FIG. 10 provided by an embodiment of the present disclosure.

FIG. 10 is another structural schematic diagram of a display panel provided by an embodiment of the present disclosure, FIG. 11 is a cross-sectional view of AA' direction shown in FIG. 10 provided by an embodiment of the present disclosure. A plurality of rows of gate lines (not shown) and a plurality of columns of data lines (not shown) are crossed to define a plurality of sub-pixels 4 on the array substrate. Each of the sub-pixels 4 is provided with a thin film transistor, a pixel electrode 25 and a common electrode 24. A gate electrode 26 of each thin film transistor is connected with the gate line, a source electrode 23 thereof is connected with the data line, and the drain electrode 27 thereof is connected with the pixel electrode 25. Under the control of a corresponding gate line, the pixel electrode 25 corresponding to the drain electrode 27 is charged/discharged by the data line corresponding to the source electrode 23 of the thin film transistor via the thin film transistor, and an electric field is formed between the pixel electrode 25 and the common electrode 24. During displaying of the liquid crystal display panel, i.e., during the display stage, the common electrode 24 receives a common voltage signal (usually a constant voltage signal), and an electric field is formed between the pixel electrode 25 and the common electrode 24, so as to control the rotation of the liquid crystal molecules in the liquid crystal layer, thereby achieving the display function.

The touch function can be implemented in a plurality of manners, for example, the common electrode 24 may be provided as a plurality of common electrode blocks, and a part of the common electrode blocks may be provided as touch electrodes so as to realize the touch function during the touch stage. In the touch stage, a touch drive end provides a touch electrical signal to the touch electrode via the touch signal line, the touch electrode senses the touch and feeds back a sensing electrical signal to the touch drive end. The touch drive end analyzes the feedback sensing electrical signal to determine the touch position, and outputs a corresponding touch operation. It should be noted that, in the display stage, all touch electrodes are multiplexed as common electrodes and configured to receive a common voltage signal.

It should be understood that, both the display drive end for providing the constant voltage signal to the common electrode in the display stage, and the touch end for providing the touch electrical signal to the touch electrode in the touch stage, can be construed as the work performed by the integrated circuit IC. With reference to FIG. 7, the integrated circuit IC may include a plurality of display pins, and the plurality of display pins may be construed as the display drive ends in the present disclosure. Similarly, the integrated circuit IC may further include a plurality of touch pins, and the plurality of touch pins may be construed as the touch drive ends, the integrated circuit IC provides different electrical signals to the display drive end and the touch drive end so as to realize different functions with only one display panel.

The integrated circuit IC may further include a force touch drive end and a corresponding force detection end for implementing the force touch function of the display panel.

In addition, since indium tin oxide (Indium Tin Oxide, ITO) has good conductivity and transparency and will not block the emergent light, the material of the common electrode in the above embodiments may be ITO.

It should be noted that, in order to make the layer relation between the sub-pixels to be more clearly, on the basis of the orientation shown in FIG. 11, an active layer 28, an insulation layer 14, a gate electrode 26, an interlayer insulation layer 13, a drain electrode 27 (or a source electrode 23), a planarization layer 16, a common electrode 24, a passivation layer 15, and a pixel electrode 25 are sequentially provided from bottom to top.

Further, two setting manners of the touch electrode in the In-Cell display panel may be provided in the following.

In a first manner, with reference to FIG. 8, a plurality of touch electrodes 64 is provided at a side of the array substrate 62 facing the color film substrate 61.

In a second manner, with reference to FIG. 9, a plurality of touch electrodes 64 is provided at a side of the color film substrate 61 facing the array substrate 62.

In the above two manners, since the touch electrode is disposed in the display panel, a thickness of the display panel can be decreased and the display panel can be made thinner and lighter.

Figure 12:
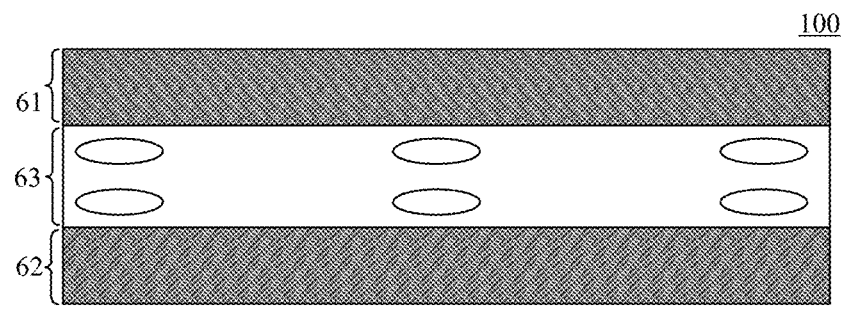
FIG. 12 is another structural schematic diagram of a display panel provided by an embodiment of the present disclosure.

As shown in FIG. 12, FIG. 12 is another structural schematic diagram of a display panel provided by an embodiment of the present disclosure. The liquid crystal display panel 100 further includes a liquid crystal layer 63 disposed between the array substrate 62 and the color film substrate 61.

Figure 13:
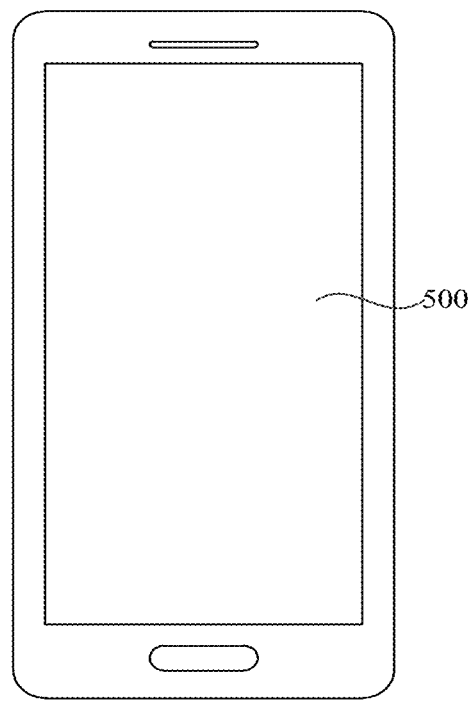
FIG. 13 is structural schematic diagram of a display device provided by an embodiment of the present disclosure.

The disclosure provides a display device, as shown in FIG. 13, FIG. 13 is structural schematic diagram of a display device provided by an embodiment of the present disclosure. The display device 500 includes the display panel 100 according to the above embodiments. It should be noted that, although a cellphone is taken as a display device in FIG. 13, the display device 500 is not limited to a cellphone, for example, the display device may be any display device having the display function, such as a personal computer, a personal digital assistant, a wireless handheld device, a tablet computer, a MP4 player, or a television, etc.

Since the display device in the embodiments includes the display panel described above, the integrated circuit IC may be provided on the integrated substrate in the display device, and the integrated circuit IC may be electrically connected with the display substrate via the circuit on the flexible circuit board. Therefore, as for the display device having a certain size, the width of the stepped area can be provided relatively small, which correspondingly reduces the width of the border of the display panel along the width direction of the stepped area, thereby being in line with the prevailing trend and beneficial to realization of a narrow border.

Finally, it should be noted that, the above-described embodiments are merely for illustrating the present disclosure but not intended to provide any limitation. Although the present disclosure has been described in detail with reference to the above-described embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:

1. A display panel, comprising:
a display substrate comprising a display area and a stepped area disposed at a side of the display area;
an integrated substrate which is provided with an integrated circuit; and
a flexible circuit board respectively connected with the stepped area of the display substrate and with the integrated substrate;
wherein the integrated circuit is electrically connected with the display substrate via a circuit on the flexible circuit board;
the integrated circuit is outside the stepped area;
a stepped bonding area and an integrated bonding area are provided at two opposite sides of the flexible circuit board respectively, the flexible circuit board is bonded to the stepped area via the stepped bonding area, and the flexible circuit board is bonded to the integrated substrate via the integrated bonding area;
a projection of the integrated circuit on the integrated substrate is completely outside a projection of the flexible circuit board on the integrated substrate; and
the display area and the stepped area are arranged sequentially along a first direction and the first direction intersects with a second direction; and
wherein the integrated circuit is disposed along the second direction, and a width of the display substrate along the second direction is equal to a width of the integrated circuit along the second direction; or the integrated circuit is disposed along the first direction, and the width of the display substrate along the second direction is smaller than a width of the integrated circuit along the first direction.

2. The display panel according to claim 1, wherein the integrated substrate is an inflexible integrated substrate or a flexible integrated substrate.

3. The display panel according to claim 2, wherein material of the inflexible integrated substrate is glass; material of the flexible integrated substrate is polyesteramide.

4. The display panel according to claim 1, wherein the display substrate comprises a display circuit and a touch circuit, and wherein the integrated circuit comprises a display pin and a touch pin, the display pin is electrically connected with the display circuit, and the touch pin is electrically connected with the touch circuit.

5. The display panel according to claim 4, wherein the display circuit comprises a pixel electrode disposed on the display substrate, and the pixel electrode is electrically connected with the display pin; and wherein the touch circuit comprises a touch electrode disposed on the display substrate, and the touch electrode is electrically connected with the touch pin.

6. The display panel according to claim 1, wherein the display panel is a liquid crystal display panel, and the liquid crystal display panel comprises: an array substrate, a color film substrate arranged opposite to the array substrate, and a plurality of touch electrodes disposed at a side of the array substrate facing the color film substrate.

7. The display panel according to claim 6, wherein the array substrate is the display substrate.

8. The display panel according to claim 1, wherein the display panel is a liquid crystal display panel, and the liquid crystal display panel comprises: an array substrate, a color film substrate arranged opposite to the array substrate, and a plurality of touch electrodes disposed at a side of the color film substrate facing the array substrate.

9. The display panel according to claim 8, wherein the array substrate is the display substrate.

10. A display device, comprising a display panel, wherein the display panel comprises:
   a display substrate comprising a display area and a stepped area disposed at a side of the display area;
   an integrated substrate which is provided with an integrated circuit; and
   a flexible circuit board respectively connected with the stepped area of the display substrate and with the integrated substrate;
   wherein the integrated circuit is electrically connected with the display substrate via a circuit on the flexible circuit board;
   the integrated circuit is outside the stepped area;
   a stepped bonding area and an integrated bonding area are provided at two opposite sides of the flexible circuit board respectively, the flexible circuit board is bonded to the stepped area via the stepped bonding area, and the flexible circuit board is bonded to the integrated substrate via the integrated bonding area;
   a projection of the integrated circuit on the integrated substrate is completely outside a projection of the flexible circuit board on the integrated substrate; and
   the display area and the stepped area are arranged sequentially along a first direction and the first direction intersects with a second direction; and
   wherein the integrated circuit is disposed along the second direction, and a width of the display substrate along the second direction is equal to a width of the integrated circuit along the second direction; or the integrated circuit is disposed along the first direction, and the width of the display substrate along the second direction is smaller than a width of the integrated circuit along the first direction.

* * * * *